United States Patent [19]
Bergmeister

[11] Patent Number: 5,725,274
[45] Date of Patent: Mar. 10, 1998

[54] BICYCLE SEAT

[76] Inventor: Josef Bergmeister, Weilheimer Strasse 2, 82418 Murnau, Germany

[21] Appl. No.: 622,839

[22] Filed: Mar. 27, 1996

[30] Foreign Application Priority Data

Mar. 31, 1995 [DE] Germany .................. 195 12 016.7

[51] Int. Cl.$^6$ ................................................ B62J 1/04
[52] U.S. Cl. ........................ 297/201; 297/312; 297/313
[58] Field of Search ........................ 297/201, 312, 297/313, 323; 482/57, 61, 56

[56] References Cited

U.S. PATENT DOCUMENTS

| | | | |
|---|---|---|---|
| 4,089,559 | 5/1978 | Prange et al. | 297/201 |
| 4,451,086 | 5/1984 | Seven | 297/201 |
| 5,387,025 | 2/1995 | Denisar | 297/201 |

FOREIGN PATENT DOCUMENTS 2121740  1/1984  United Kingdom ............... 297/201

*Primary Examiner*—Peter R. Brown
*Assistant Examiner*—Anthony D. Barfield
*Attorney, Agent, or Firm*—Juettner Pyle Lloyd & Piontek

[57] ABSTRACT

Small conventional saddles squeeze the buttocks area strongly, whereas large conventional saddles have the effect that the buttocks area slips over the saddle during pedaling. When a bicycle is only used occasionally, both situations have unpleasant consequences, at least when large distances are covered. The present bicycle seat prevents pain in that it consists of two seat halves that are other and follow the cranking motion exerted by the legs of the rider in opposite directions. As a result, the position of the hip joint of the rider remains substantially unchanged. The bicycle seat permits an upright and ergonomic sitting posture.

9 Claims, 7 Drawing Sheets

BICYCLE SEAT

BACKGROUND OF THE INVENTION

The present invention relates to a bicycle seat. Although the seat is especially suited for bicycles, it is basically possible to put the seat to advantageous use in other pedal-propelled vehicles, for instance, in exercise or fitness devices provided with pedals.

A conventional bicycle saddle entails considerable disadvantages, especially for those riders who cycle only occasionally. A small saddle, which is often used in racing bicycles or mountain bikes, strongly squeezes the pubic bone, which possibly causes severe pain if the rider is not accustomed to cycling. Although a large saddle avoids such painful accompanying phenomena during pedaling, such a saddle has the disadvantage that the rider slips constantly back and forth on the saddle with his buttocks while pedaling, which, if he is not used to such movements, has the effect that the buttocks get gradually sore.

EP 0 467 541, DE 8805245 U1 and U.S. Pat. No. 4,089,559 already disclose bicycle seats comprising two movable seat halves that are supported to pivot in opposite directions. The opposite movability of the seat halves largely prevents the rider from slipping back and forth with his buttocks on the saddle while pedaling, as is the case with one-part bicycle seats.

In all of the three bipartite prior-art bicycle saddles, the center point of the pivotal movement of the saddle halves is below the seat surfaces of the halves, which has the effect that the cranking motion exerted by the legs of the rider leads to rotational or pivotable movements in the hip area. In the long run, this will cause pain in the hip portion.

SUMMARY OF THE INVENTION

It is the object of the present invention to develop a bicycle seat of the above-mentioned type in such a manner that it allows an improved motional sequence that is gentle on the rider.

The seat of the present invention comprises two movable seat halves that are supported to pivot in opposite directions. These seat halves are moved in opposite directions during pedaling, i.e., one saddle half is pivoted rearwards and upwards in the riding direction when the associated foot of the rider moves downwards during pedaling, whereas the other seat half is pivoted forwardly and downwardly when the associated foot simultaneously moves into the lifted position. These movements are reversed after the pedals have passed the lowermost or uppermost pedaling point.

Hence, the seat halves are automatically adapted to the movement of the thigh and of the subsequent buttocks area of the rider, so that the rider cannot slip on the support surfaces of the seat halves, but rests on them without any relative movement. Since the support surfaces, which can be tray-shaped, may have a relatively large size as compared with conventional saddles, painful pressure will reliably be prevented.

Furthermore, the center point of the pivotal movement of the seat halves is located according to the invention above the seat surfaces of the halves, namely at a distance of about 5 to 15 cm from the seat surfaces, so that the pivot axis is approximately located in the area of the hip joint of a user.

Such a design has the effect that the axis of the hip joint of the rider substantially remains constant during pedaling, whereby the motional sequence becomes considerably smoother and cycling more comfortable even for untrained riders and over a long period of time.

The support surfaces of the seat halves may be formed by plastic trays which are adapted to the associated contours of the upper pan of the thigh and the subsequent buttocks of the rider. The support trays may, of course, be padded, a resilient support being also possible as a rule. The tray-shaped support surface may be raised on the outside to give the rider a lateral support on the seat halves.

In another aspect of the invention, the seat halves are supported on rollers which are expediently supported at the free ends of steel rods on ball bearings. The steel rods with the bearing rollers may project at both sides from a chassis which is adapted to be mounted on a series-produced saddle tube of the bicycle.

The seat halves may be provided below the support surfaces with roller bearing surfaces that are formed by curved flat tracks and have preferably the shape of a circular are, with the bearing rollers resting on the bottom side and the upper side of the roller bearing track. For instance, two rollers support the roller bearing surface from below whereas a roller resting on the upper side of the roller bearing surface prevents the seat half from lifting upwards. Stop discs or low-friction side guides of a different type could, for instance, grip laterally over the edge of the roller bearing surface, whereby a lateral movement on the rollers will be prevented.

The seat halves can, of course, be covered, thereby preventing, among other things, that foreign matter which could prevent a smooth pivotal movement of the seat halves gets stuck on or at the roller bearing surface.

A pivotable mounting of the seat halves, however, can also be accomplished in a different way. For instance, the seat halves can be pivotally suspended on a frame which is preferably U-shaped and which can, for instance, be secured to an additional linkage mounted behind the series-produced saddle tube of the bicycle. In this embodiment, each seat half may be provided on the outside with a fastening section which extends from the support surface upwards and the upper end of which is seated on a pivot pin held in the associated vertical leg of the U-shaped frame. This pivotable mounting is such that the support surfaces of the seat halves extend substantially in horizontal direction when viewed in cross-section.

With such a development of the invention, the two seat halves are also oppositely pivoted during pedaling about an axis located in the area of the rider's hip joint, so that the position of the rider's hip joint remains constant and no slippage occurs on the support surfaces of the bicycle seat.

The present invention is not limited to the above-described pivotable mountings of the seat halves, but can also be implemented by other embodiments. For instance, the seat halves may each rest on two articulation rods which may be spaced apart from each other below the support tray and may be hinged with their other ends to a frame member, the dimensions and geometry of the arrangement being chosen such that the seat halves are in a position to perform a limited pivotal movement of a sufficient pivotal range. The rods are expediently at angles with each other and may be of different length. In such a case, too, the one seat half will be pivoted rearwards and upwards in riding direction when the pedal of the side in question approaches the lower position in which the rider's leg will more and more pass into a stretched state, whereas the other seat half will be pivoted forwards into an approximately horizontal position.

According to another suggestion of the invention, the distance between the seat halves can be adjusted. This can, for instance, be accomplished in that the distance of the rollers from the chassis that holds the same is adjustable or in that the U-shaped frame on which the seat halves are suspended is adjustable in width in a telescopic manner.

Another great advantage is that a centering element is arranged in the middle between the seat halves. The centering element which may have an elongated member, for instance, in the form of a tiny saddle and which, like a saddle, may be equipped with a padded surface arranged at such a location that is in contact with the pubic bone of the rider without any substantial weight resting on the centering element. Hence, the centering element is located at a slightly higher level and in front of the seat halves in the riding direction. This centering element, which may also be arranged between the thighs of the rider, will give the rider an additional lateral support.

According to another suggestion of the invention, the two seat halves may be coupled with each other such that they are forcedly movable in opposite directions. To this end, a deflection pulley over which a wire mechanism, or the like, runs, the wire being secured to the two seat halves, may, for instance, be secured at a suitable location on the bicycle frame in front of the two seat halves. When in this embodiment the one saddle half is moved rearwards while the associated pedal is approaching the lower position, the other seat half will automatically be pulled forwards. Such an automatic support of the forward movement of the respective seat half can also be accomplished with another suitable mechanism or another coupling of the seat halves. It should be noted that this arrangement for creating a forced opposite movement of the two seat halves can be provided for in all of the above-described embodiments, but is not imperative.

According to another suggestion of the invention, the distance of the pivot axis from the seat surfaces of the seat halves may be adjustable, for instance, in that the length of the other support arms of the seat halves or the length or position of the support rods below the seat halves is variable, so that the position of the pivot axis can individually be matched to the hip joint.

With the bicycle seat of the invention, persons who cycle only occasionally can also cover large distances without the bicycle seat causing any pain. Since the opposite cranking motions exerted by the legs are compensated for by a correspondingly opposite pivotal movement of the seat halves, and since the pivot axis is positioned in the area of the hip joint of the rider, the position of the hip joint of the rider does not change (or only changes to a minimum degree), resulting in a smoother motional sequence. Moreover, the saddle permits an upright ergonomic sitting posture, making cycling more comfortable also over a long period of time.

BRIEF DESCRIPTION OF THE DRAWINGS

Three embodiments of the invention will now be described in more detail with reference to the drawing, in which.

DESCRIPTION OF THE PREFERRED EMBODIMENTS

Figure 1:
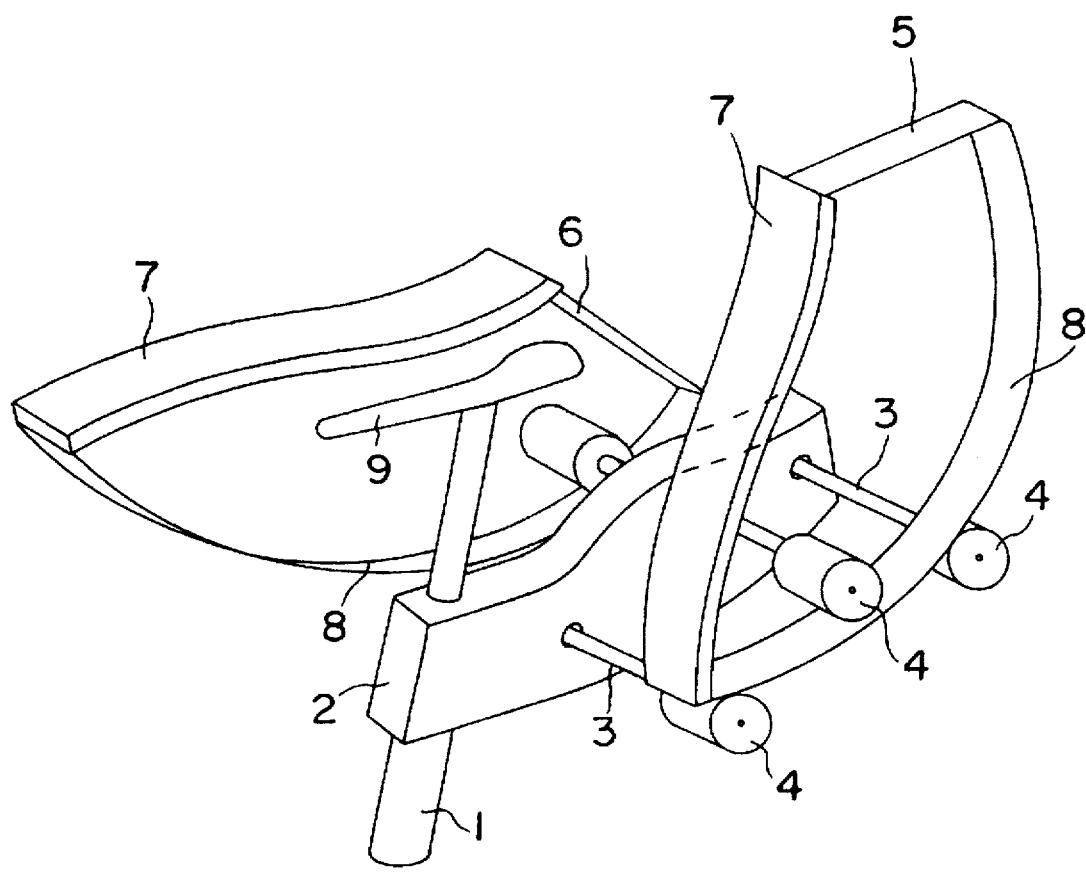
FIG. 1 is a substantially diagrammatic perspective view of a bicycle seat whose seat halves are pivoted in opposite directions.
Figure 2:
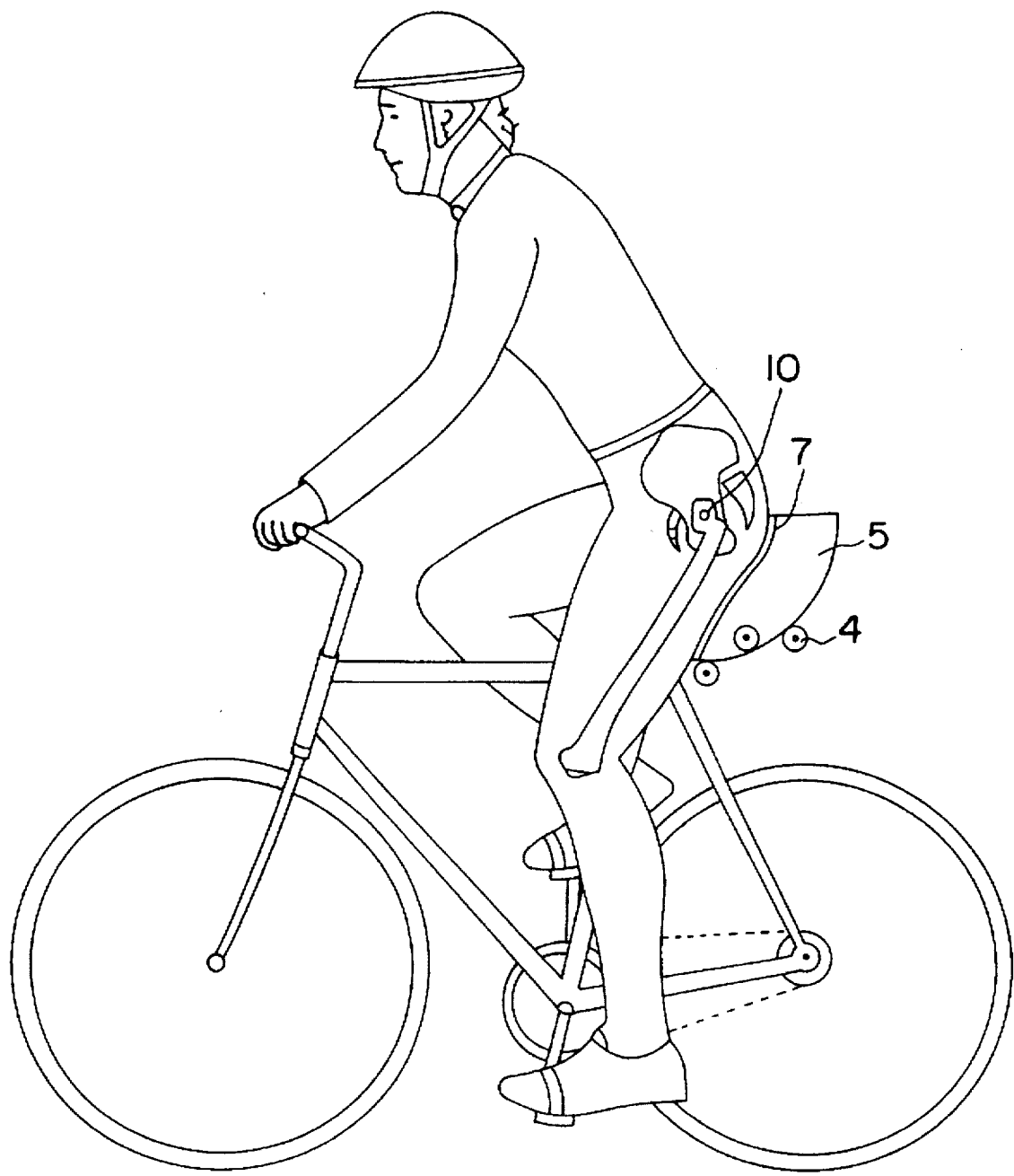
FIG. 2 is a lateral view of a bicycle including the vehicle seat of FIG. 1, with a rider having his left leg stretched.
Figure 3:
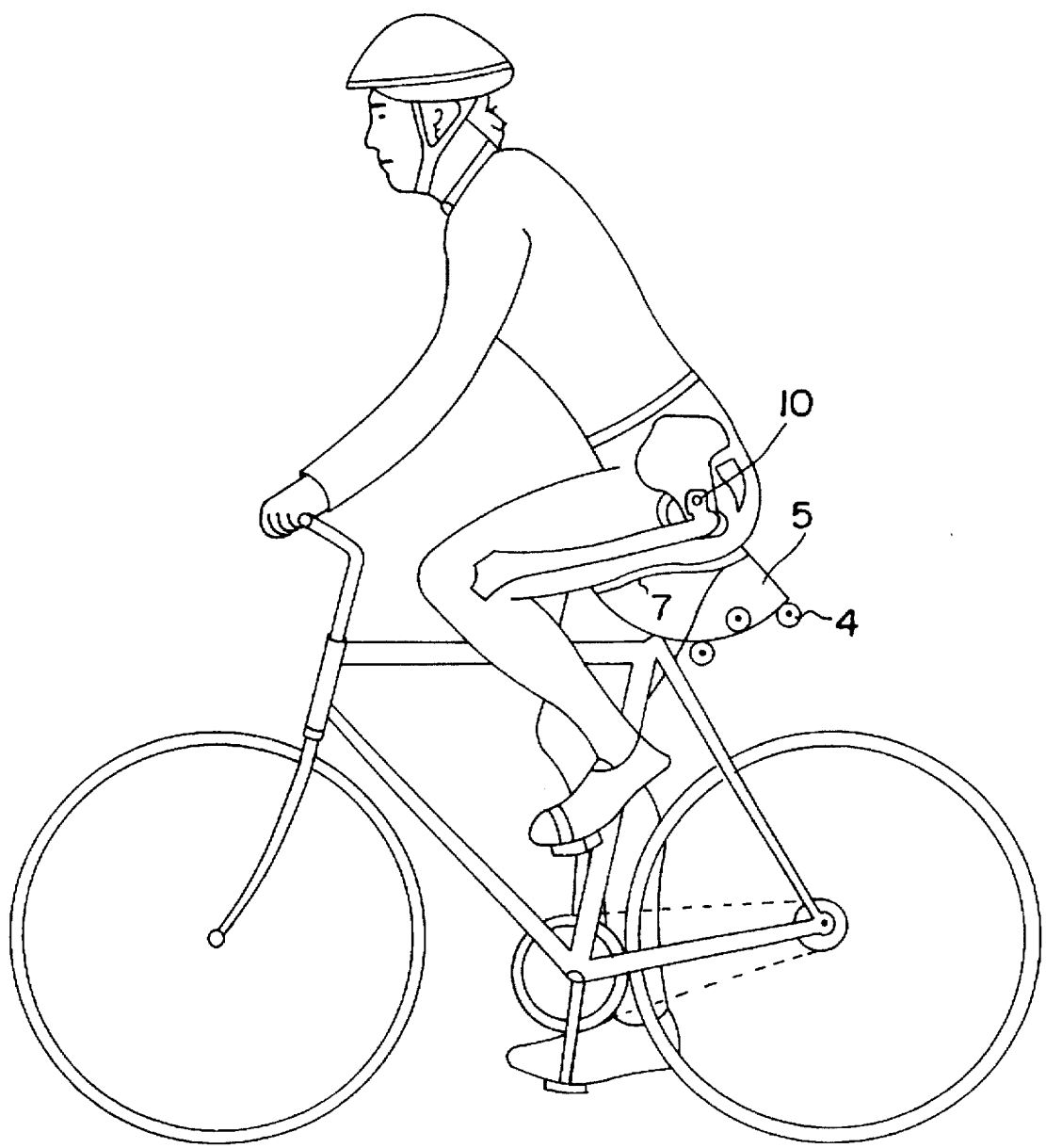
FIG. 3 is an illustration similar to FIG. 2, but with the rider's left leg being bent.

FIGS. 1 to 3 show a first embodiment of the bicycle seat, illustrating, like the subsequent figures, too, only the main parts of the vehicle seat.

The series-produced saddle tube 1 has seated thereon in a vertically adjustable manner a chassis 2 which has secured thereto laterally projecting rods 3 which hold roller bearings 4 at their free ends.

This arrangement serves the pivotable mounting of two seat halves 5, 6 which have each a support tray 7 on which the buttocks area of the rider rests, as well as a roller bearing surface 8 made from a curved flat iron. Seat halves 5, 6 rest each with their roller bearing surfaces 8 on two roller bearings, whereas the upper side of the roller bearing surface 8 has seated thereon a third bearing roller 4 which prevents the seat halves 5, 6 from performing an upward lifting movement. Stop elements (not shown) prevent the seat halves 5, 6 from performing a lateral movement.

A centering element 9 is secured to the chassis 2 in a vertically adjustable manner in front of the seat halves when viewed in the riding direction. The centering element 9 has the shape of a tiny, small-sized saddle and is padded accordingly. The centering element gives the rider an additional lateral support on the bicycle seat.

FIG. 1 shows the bicycle seat in a situation where the rider occupies the position illustrated in FIG. 2, in which the left pedal is in the lowermost position in which the left leg of the rider is almost stretched. In this position, seat half 5 is pivoted backwards and upwards, so that support surface 7 assumes a steep inclined position in accordance with the position of the thigh of the rider.

In the lifted position of the rider's left foot, seat half 5 is pivoted forwards, so that the support surface 7 is only slightly inclined forwardly.

FIGS. 2 and 3 illustrate the skeleton of a rider in the area of his hip joint. As becomes apparent from the illustration, the position of the hip joint remains virtually unchanged during the cranking motion exerted by the legs. This is accomplished in that the roller bearing surface 8 is shaped like a section of a circular arc whose center point is located in the area of hip joint 10. Distance a of the center point 10 of the pivotal movement from the seat surface is about 5 to 15 cm.

Figure 4:
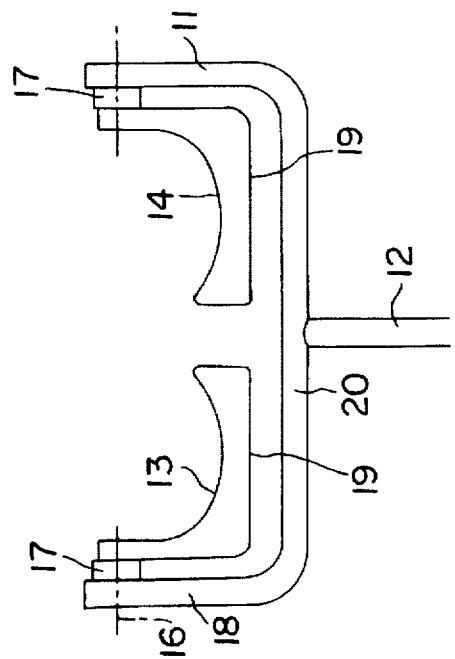
FIG. 4 is a diagrammatic rear view of a second embodiment of the bicycle seat.
Figure 5:
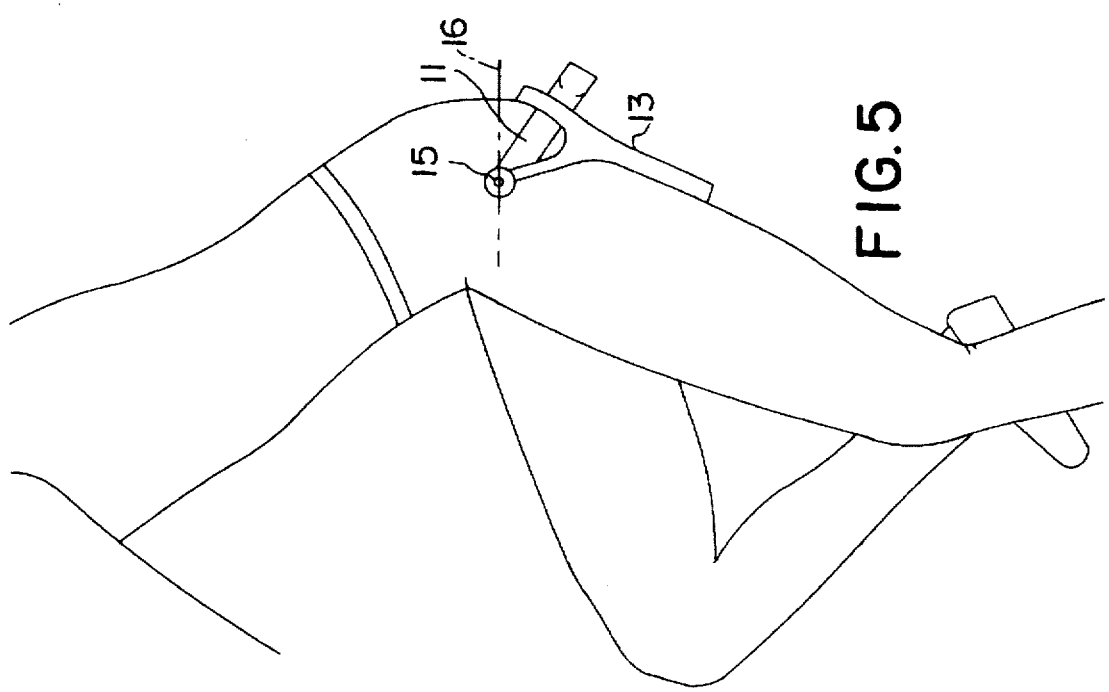
FIG. 5 shows the left seat half of the embodiment according to FIG. 4 in the lower pedal position.
Figure 6:
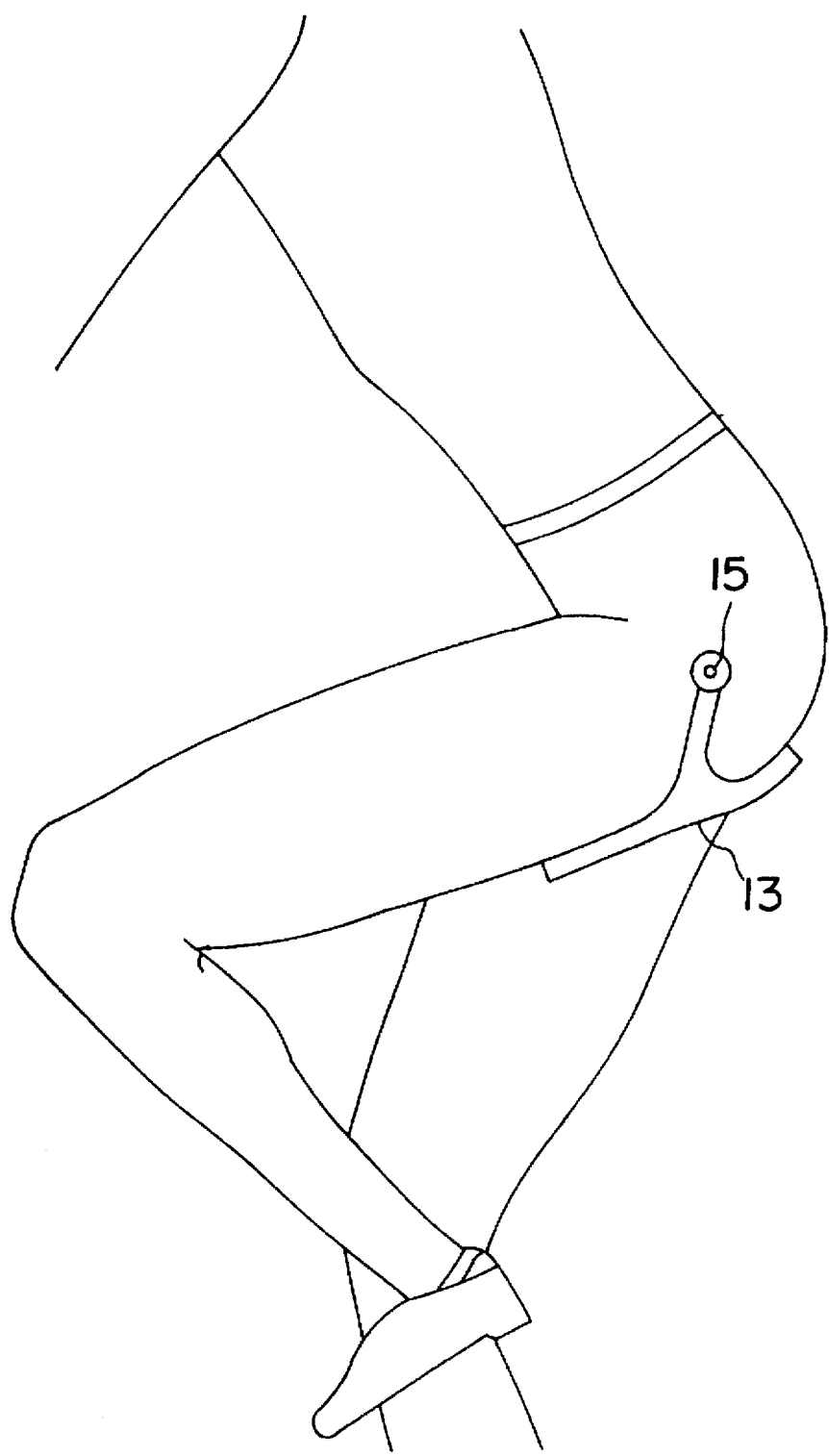
FIG. 6 shows the left seat half in the upper pedal position.

FIG. 4 shows a second embodiment of the bicycle seat in a purely diagrammatic manner. A U-shaped frame 11 is here secured by means of a tube 12 to the bicycle frame. Two seat halves 13, 14, which are formed as plastic trays, are hinged via pivot pins 15 to the upper ends of the U-shaped frame 11, the hinges being located along a joint axis 16. The seat halves 13, 14 are here kept by spacers 17 at a distance from the vertical legs 18, the substantially horizontal support section 19 of said halves being of course also kept at a distance from the horizontal leg 20 of the U-shaped frame 11 and held substantially in parallel therewith.

The two seat halves 13, 14 are also oppositely pivoted during pedaling, like in the first embodiment. Axis 16 and hinges 15, respectively, are substantially in the position of the rider's hip joint.

Figure 7:
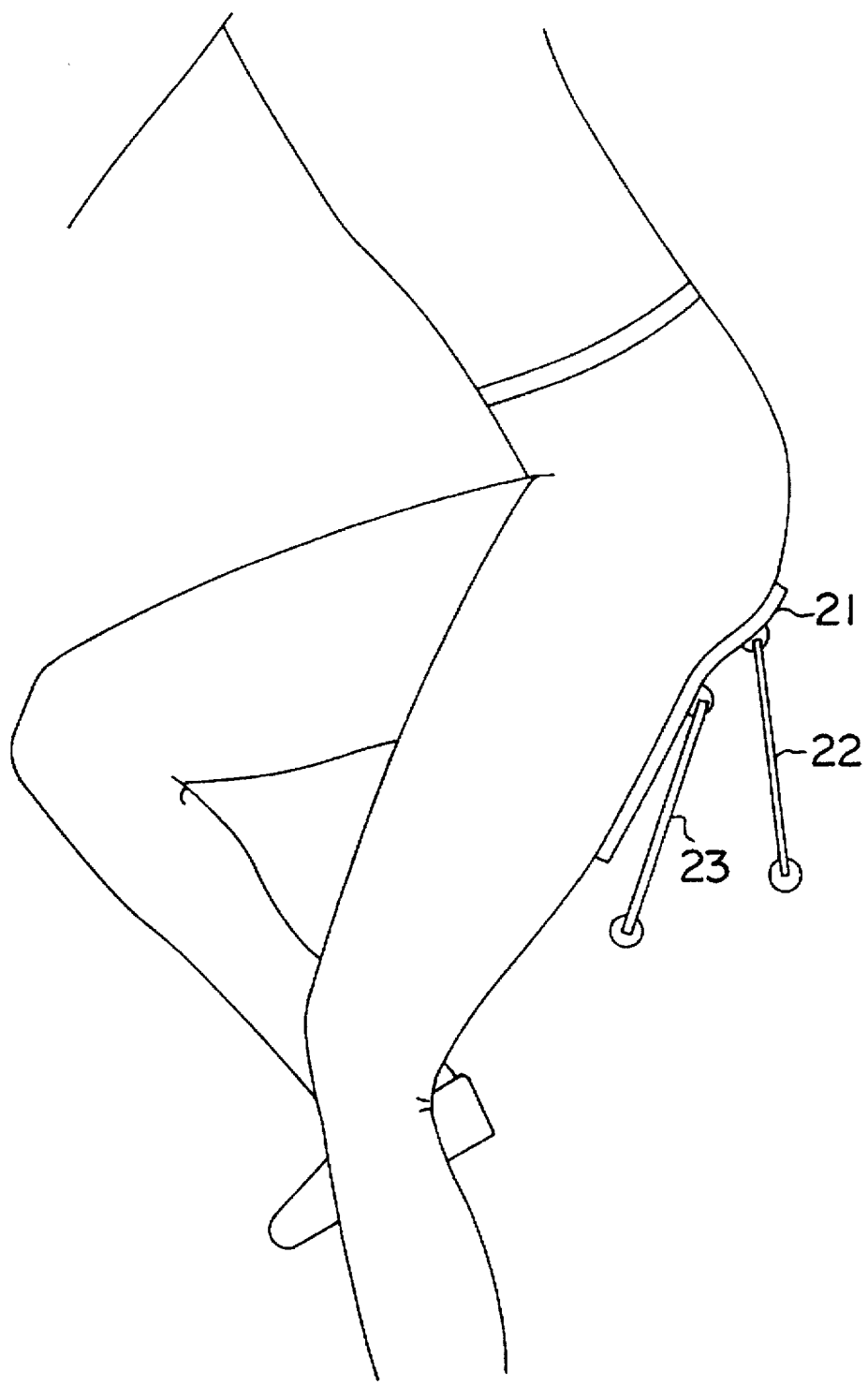
FIG. 7 shows the left seat half of a third embodiment of the bicycle seat in the lifted pedal position.
Figure 8:
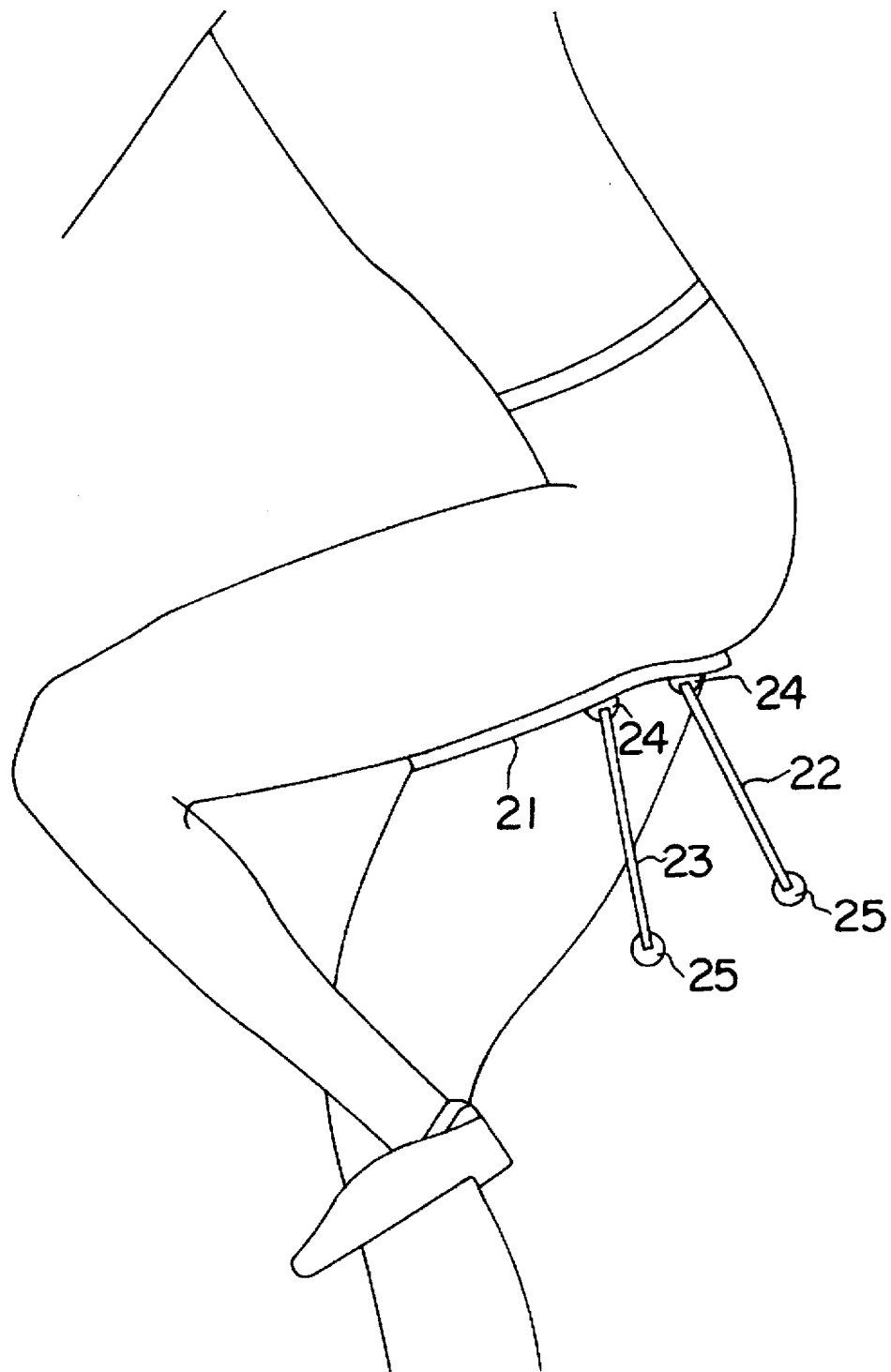
FIG. 8 shows the seat half according to FIG. 7 in the lower pedal position.

The embodiment which is diagrammatically shown in FIGS. 7 and 8 contains support trays 21 whose bottom side has respectively hinged thereto two rods 22, 23 the other ends of which are articulated to a chassis or frame member (not shown). The upper articulation points 24 have a smaller distance from each other than the lower articulation points 25.

In this embodiment, too, the seat halves are oppositely pivotable, as shown in FIGS. 7 and 8 for the lowermost and uppermost pedal positions. The dimensions and the geometry of the arrangement are chosen such that the center point of the pivotal movement substantially corresponds again to the position of the rider's hip joint.

What is claimed is:

1. A bicycle seat for a bicycle, said bicycle seat comprising a pair of seat halves having upper seat surfaces, and means for supporting each of the seat halves for movement about a pivotal axis, said seat halves and upper seat surfaces being movable about the pivotal axis from a horizontal position to a downwardly inclined position, said pivotal axis being located above said upper seat surfaces with said seat halves in the horizontal position.

2. A bicycle seat according to claim 1, wherein the distance of the pivot axis above the upper seat surfaces is about 5 to 15 cm.

3. A bicycle seat according to claim 1, wherein said seat halves are supported on rollers.

4. The bicycle seat of claim 1 wherein the means for supporting each of the seat halves comprises a frame extending along the sides of said seat halves, and a pivot connection between said frame and the sides of said seat halves.

5. The bicycle seat f claim 1 wherein the means for supporting each of the seat halves comprises rods articulated between each of the seat halves and a lower support.

6. The bicycle seat of claim 5 wherein said rods converge upwardly from said lower support.

7. A bicycle seat according to claim 1, additionally comprising a centering support element arranged in the center between said seat halves.

8. A bicycle seat according to claim 1, wherein said seat halves are coupled with each other for a forced opposite movement.

9. The bicycle seat of claim 1 wherein an arcuate bearing member is associated with each of the seat halves and has opposite bearing surfaces, and a plurality of rollers are disposed against said opposite bearing surfaces.

* * * * *